(12) United States Patent
Tourneur et al.

(10) Patent No.: US 10,773,832 B2
(45) Date of Patent: Sep. 15, 2020

(54) PROJECTILE INTENDED FOR DAMPING A SPACECRAFT AND CORRESPONDING SPACE DELIVERY VEHICLE

(71) Applicant: AIRBUS DEFENCE AND SPACE SAS, Toulouse (FR)

(72) Inventors: Cyril Tourneur, Toulouse (FR); Kristen Lagadec, Toulouse (FR)

(73) Assignee: AIRBUS DEFENCE AND SPACE SAS, Toulouse (FR)

(*) Notice: Subject to any disclaimer, the term of this patent is extended or adjusted under 35 U.S.C. 154(b) by 0 days.

(21) Appl. No.: 16/348,731

(22) PCT Filed: Nov. 10, 2017

(86) PCT No.: PCT/EP2017/078848
§ 371 (c)(1),
(2) Date: May 9, 2019

(87) PCT Pub. No.: WO2018/087273
PCT Pub. Date: May 17, 2018

(65) Prior Publication Data
US 2019/0283907 A1  Sep. 19, 2019

(30) Foreign Application Priority Data
Nov. 10, 2016  (FR) ...................... 16 60918

(51) Int. Cl.
*B64G 1/38* (2006.01)
*B64G 1/24* (2006.01)
(Continued)

(52) U.S. Cl.
CPC ............. *B64G 1/38* (2013.01); *B64G 1/244* (2019.05); *B64G 1/32* (2013.01); *B64G 1/646* (2013.01);
(Continued)

(58) Field of Classification Search
CPC ........ B64G 1/244; B64G 1/283; B64G 1/285; B64G 1/286; B64G 1/32; B64G 1/38; B64G 1/646
See application file for complete search history.

(56) References Cited

U.S. PATENT DOCUMENTS 3,399,317 A * 8/1968 Davis .................. B64G 1/24
310/93
3,544,022 A * 12/1970 Jones .................. B64G 1/10
220/23.4
(Continued)

FOREIGN PATENT DOCUMENTS

| CN | 102042359 A * | 5/2011 |
| EP | 2671804 | 12/2013 |

(Continued)

OTHER PUBLICATIONS

International Search Report, PCT/EP2017/078848, dated Feb. 21, 2018.

*Primary Examiner* — Richard R. Green
(74) *Attorney, Agent, or Firm* — Nixon & Vanderhye (57) ABSTRACT

A projectile intended for damping a spacecraft (100) comprising a main body (110) and active attitude control means (150) comprises a harpoon and is intended to equip a space delivery vehicle to be projected towards the spacecraft. It comprises a passive damper (200) mounted such that it is fixed on the harpoon and suitable for generating, in cooperation with the Earth's magnetic field, a damping torque. That passive damper (200) comprises an outer enclosure (210) and an inner body (220) configured such that:
- the inner body, permanently magnetized, is positioned inside the outer enclosure and is capable of moving in rotation about at least one axis of rotation,
- the outer enclosure and the inner body comprise respectively an inner surface and an outer surface, separated by means of a viscous fluid, (Continued)

the outer enclosure is fixed to the main body of the spacecraft for rotation therewith once the harpoon is secured to the main body.

15 Claims, 3 Drawing Sheets

(51) Int. Cl.
*B64G 1/32* (2006.01)
*B64G 1/64* (2006.01)
*B64G 4/00* (2006.01)
*B64G 1/66* (2006.01)

(52) U.S. Cl.
CPC ............ *B64G 1/66* (2013.01); *B64G 4/00* (2013.01); *B64G 2700/24* (2013.01)

(56) References Cited

U.S. PATENT DOCUMENTS

| | | | | |
|---|---|---|---|---|
| 4,034,941 A | * | 7/1977 | Godet | B64G 1/32 244/166 |
| 5,259,577 A | * | 11/1993 | Achkar | B64G 1/244 244/164 |
| 9,463,884 B2 | * | 10/2016 | Kitazawa | B64G 1/32 |
| 9,663,250 B1 | * | 5/2017 | Gravseth | B64G 1/32 |

FOREIGN PATENT DOCUMENTS

| | | | |
|---|---|---|---|
| EP | 2746163 | 6/2014 | |
| EP | 3 029 410 | 6/2016 | |
| GB | 2 241 480 | 9/1991 | |
| GB | 2 241 481 | 9/1991 | |
| GB | 2241481 A | * 9/1991 | ............... B64G 1/32 |

* cited by examiner

PROJECTILE INTENDED FOR DAMPING A SPACECRAFT AND CORRESPONDING SPACE DELIVERY VEHICLE

TECHNICAL FIELD

The present invention concerns the field of attitude control in spacecraft, such as satellites. The disclosure relates more particularly to a spacecraft comprising active attitude control means and passive attitude control means. One particularly advantageous but non-limiting application of the invention is the case of satellites in a low orbit.

PRIOR ART

The orbit and attitude control system of a spacecraft is essential to the correct performance of a mission, regardless of the type of spacecraft concerned (satellite, space platform, launch vehicle, deep-space probe, etc.)

The term "attitude control" used herein refers to the control of the spacecraft's orientation, i.e. generally speaking, of the movement of said spacecraft about the centre of mass thereof (also known as the centre of inertia).

To date, when the spacecraft is operating in an operational orbit, different means exist for actively controlling the attitude thereof, which means use electronics, information technology and sensors and actuators which consume energy and have a limited life span. For example, in the case of a three-axis stabilised satellite, active attitude control means are known, such as:

inertial actuators that do not change the total angular moment of the satellite, such as reaction wheels or gyroscopic actuators,
  actuators that do change the total angular moment of the satellite, such as thrusters or magnetic torque rods.

When the active attitude control means stop working, either as a result of a malfunction or because the power sources supplying them are spent or have malfunctioned, said spacecraft is considered to have become space debris. Such debris is known to be especially animated by a rotational movement about the centre of mass thereof, sometimes with a high rotational speed, for example of several degrees per second. Multiple causes of such a rotational speed can exist: accumulated internal moment, thruster malfunction, external torque caused by the solar radiation pressure, etc. In a manner known by a person skilled in the art, those debris have a variable, arbitrary attitude and are typically animated by a Poinsot motion.

The presence in space of such space debris is problematic since it creates space pollution insofar as the latter follow trajectories that can cross those occupied by functional spacecrafts, which creates collision risks. Moreover, collisions between debris increase the total number of debris particles, which further accentuates the risk of collision for functional spacecrafts.

Said space debris can also cross the orbits of other functional satellites, which creates collision risks.

Moreover, in order to capture and remove such space debris from orbit, other spacecrafts are known and are suitable for performing manoeuvres such as docking onto debris, in order to form a composite, like for example deorbiting satellites such as those disclosed in patent applications EP 2746163 and EP 2671804. Nonetheless, it is understood that the rotational speed of the debris remains a factor that limits the success of such a capture/deorbiting mission. More specifically, the higher the rotational speed, the more said manoeuvres, in particular capture, are difficult to achieve. Moreover, even in the case of a successful capture operation, the subsequent operations for controlling the composite and removing it from orbit are incompatible with a high rotational speed, in particular when the debris is connected to the deorbiting satellite by flexible ties, for example a harpoon. Slowing of the rotational speed of the debris is thus sought for the successful deorbiting thereof.

SUMMARY

The purpose of the present disclosure is to overcome all or part of the drawbacks of the prior art, in particular those described hereinabove, by proposing a solution that produces a spacecraft comprising active attitude control means, in addition to passive attitude control means suitable for slowing the rotation of said spacecraft when the active control means thereof have developed a permanent malfunction.

For this purpose, and according to a first feature, the disclosure relates to a spacecraft comprising a main body and an attitude control system, said attitude control system comprising active attitude control means suitable for the 3-axis stabilisation of the attitude of said spacecraft. Moreover, said attitude control system further comprises passive attitude control means suitable for generating, in cooperation with the Earth's magnetic field, a damping torque and comprising at least one passive damper, said at least one passive damper comprising an outer enclosure and an inner body that are configured such that:

said inner body is positioned inside said outer enclosure and is capable of moving in rotation inside said outer enclosure about at least one axis of rotation,
  said outer enclosure comprises an inner surface and said inner body comprises an outer surface, said surfaces being separated by means of a viscous fluid,
  said inner body is permanently magnetised,
  said outer enclosure is fixed to the main body of said spacecraft for rotation therewith.

According to specific embodiments, the spacecraft can further comprise one or more of the following features, which must be considered singly or according to any combinations technically possible.

In one specific embodiment, the active attitude control means are at least one reaction wheel or at least one gyroscopic actuator.

In one specific embodiment, the active attitude control means generate an active control torque of maximum value $C_a$, and the passive control means generate a damping torque of maximum value $C_p$ such that the ratio $C_a/C_p$ is substantially greater than 10, preferably substantially greater than 100.

In one specific embodiment, the passive control means of the spacecraft, intended to be subjected to external perturbation torque, generate a damping torque of maximum value $C_p$ that is less than said external perturbation torque by a factor of substantially equal to 10, preferably substantially equal to 100.

In one specific embodiment, said main body comprises an inner surface, said at least one passive damper being positioned on said inner surface.

In one specific embodiment, said main body comprises an outer surface, said at least one passive damper being positioned on said outer surface.

In one specific embodiment, said at least one passive damper is devoid of any means for maintaining a gap between said outer enclosure and said inner body.

In one specific embodiment, said inner body is capable of moving in rotation inside said outer enclosure about arbitrary axes of rotation.

In one specific embodiment, the inner surface of the outer enclosure and the outer surface of the inner body are respectively spherical in shape.

In one specific embodiment, said spacecraft comprises a plurality of passive dampers.

In one specific embodiment, said inner body is capable of moving in rotation inside said outer enclosure about a single axis of rotation.

In one specific embodiment, the inner surface of the outer enclosure and the outer surface of the inner body each have a single axis of revolution that is substantially aligned with said single axis of rotation, and are furthermore substantially proportional. Surprisingly, the use of a single passive damper in such an arrangement produces a deceleration.

In one specific embodiment, the inner surface of the outer enclosure and the outer surface of the inner body are respectively cylindrical in shape.

In one specific embodiment, said spacecraft comprises two passive dampers arranged such that the axes of rotation of the respective inner bodies thereof are not parallel in pairs.

In one specific embodiment, said spacecraft comprises three passive dampers arranged such that the axes of rotation of the respective inner bodies thereof are not parallel in pairs.

In one specific embodiment, the inner body comprises an inner enclosure comprising a permanent magnet fixed to said inner enclosure for rotation therewith.

In one specific embodiment, said inner enclosure comprises polyurethane foam inside a volume that is not occupied by said permanent magnet.

In one specific embodiment, the inner body is solid.

In one specific embodiment, at least one of either the inner surface of the outer enclosure or the outer surface of the inner body is made of a non-metallic material.

In one specific embodiment, the inner surface of the outer enclosure is made of a synthetic resin of the polyimide type.

In one specific embodiment, the densities respectively of the inner body and of the viscous fluid are substantially equal for at least one temperature of said viscous fluid lying in the interval [10° C., 30° C.].

In one specific embodiment, the pressure of the viscous fluid is substantially equal to 5 bar for at least one temperature lying in the interval [10° C., 30° C.].

In one specific embodiment, the viscous fluid is silicon oil of the dimethicone type.

According to a second feature, the present disclosure relates to a spacecraft comprising a main body and an attitude control system, said attitude control system comprising active attitude control means suitable for the 3-axis stabilisation of the attitude of said spacecraft by generating an active control torque of maximum value $C_a$. Moreover, said attitude control system further comprises passive attitude control means suitable for generating, in cooperation with the Earth's magnetic field, a damping torque of maximum value $C_p$ such that the ratio $C_a/C_p$ is substantially greater than 10, preferably substantially greater than 100.

In specific embodiments, the passive control means of the spacecraft, intended to be subjected to external perturbation torque, generate a damping torque of maximum value $C_p$ that is less than said external perturbation torque by a factor of substantially equal to 10, preferably substantially equal to 100.

According to a third feature, the present disclosure relates to a projectile intended for damping a spacecraft comprising a main body and active attitude control means suitable for the 3-axis stabilisation of the attitude of said spacecraft, said projectile comprising a harpoon and being intended to equip a space delivery vehicle, that is different from the spacecraft, in order to be projected from said space delivery vehicle towards said spacecraft. Moreover, said projectile comprises a passive damper mounted such that it is fixed on said harpoon and suitable for generating, in cooperation with the Earth's magnetic field, a damping torque, said passive damper comprising an outer enclosure and an inner body that are configured such that:

said inner body is positioned inside said outer enclosure and is capable of moving in rotation inside said outer enclosure about at least one axis of rotation, said outer enclosure comprises an inner surface and said inner body comprises an outer surface, said surfaces being separated by means of a viscous fluid, said inner body is permanently magnetised, said outer enclosure is fixed to the main body of said spacecraft for rotation therewith once the harpoon is secured to said main body.

In specific embodiments, the inner body of the passive damper mounted such that it is fixed on the harpoon is capable of moving in rotation inside said outer enclosure about a single axis of rotation, the inner surface of the outer enclosure and the outer surface of the inner body each having a single axis of revolution that is substantially aligned with said single axis of rotation, and which are furthermore substantially proportional.

According to a fourth feature, the present disclosure relates to a space delivery vehicle comprising at least one projectile according to the disclosure.

PRESENTATION OF THE FIGURES

The characteristics and advantages of the invention will be better understood after reading the following description, which discloses particular embodiments, which are in no way limiting.

The description is given with reference to the accompanying figures, which show.

In these figures, identical reference numerals in one or another figure denote identical or similar elements. For clarity purposes, the elements shown are not to scale, unless specified otherwise.

DETAILED DESCRIPTION OF EMBODIMENTS

The present invention relates to the field of passive attitude control of a spacecraft rotating about itself.

Figure 1:
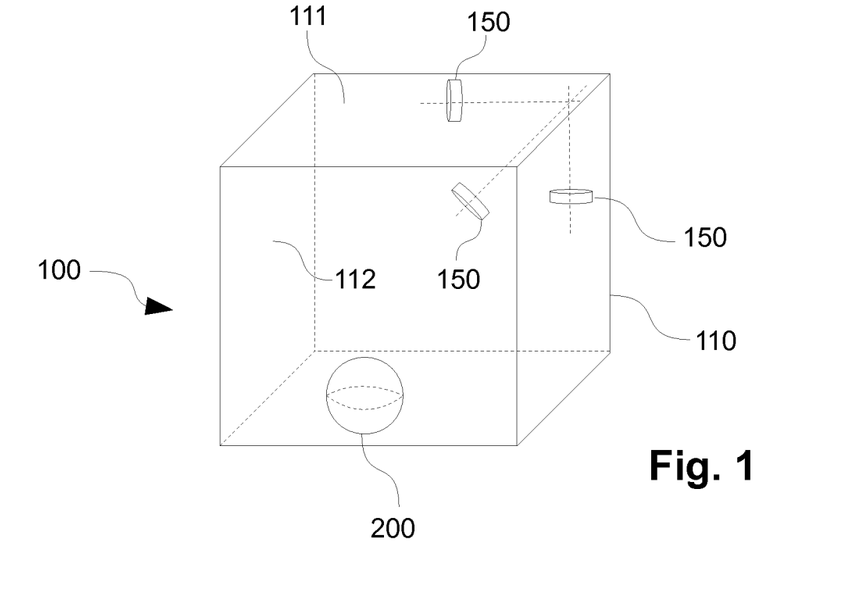
FIG. 1: a diagrammatic view of an example embodiment of a spacecraft comprising active attitude control means and passive attitude control means.

FIG. 1 diagrammatically illustrates one example embodiment of a spacecraft 100 comprising an attitude control system.

The term "attitude control" used herein refers to the control of the orientation of the spacecraft 100, i.e. generally speaking, of the movement of said spacecraft 100 about the centre of mass thereof (also known as the centre of inertia). This orientation can more particularly correspond to the direction of a predetermined axis defined in a frame of reference associated with the geometrical configuration of said spacecraft 100. Moreover and more specifically, the term "active" (and respectively "passive") is used to describe an attitude control, the implementation whereof consumes at least one (and respectively does not consume any) electrical or chemical power source on-board the spacecraft 100.

Moreover, said spacecraft 100 comprises orbit control means that are not shown in FIG. 1. The term "orbit control" is used herein to refer to the control of the movement of the centre of mass of said spacecraft 100 in an inertial frame of reference. For example, said orbit control means are chemical and/or electrical thrusters.

The description provided below more specifically, however in a non-limiting manner, concerns the case in which the spacecraft is a satellite 100, intended to rotate about itself in space in an orbit such that the magnetic field affecting this orbit allows for the operation of the invention. Preferably, the satellite 100 was initially placed in a low Earth orbit, also known by a person skilled in the art as "LEO", by means of a launch vehicle, and is currently in a spent configuration in its final orbit. The term "low Earth orbit" is used herein to refer to an orbit that is typically less than 3,000 km, or even less than 1,500 km, whereby the Earth's magnetic field affecting this type of orbit is about 30 µT at 1,000 km. The terms "spent configuration" are used herein to refer to a satellite that is unable to continue the mission assigned thereto, for example as a result of a malfunction affecting the attitude control system, so much so that it is considered to have become space debris. Moreover, the inclination of the orbit of the satellite 100 is sufficient to allow the Earth's magnetic field to have a variable orientation in a local orbital frame of reference. For example, the satellite 100 advantageously follows a polar or sun-synchronous orbit.

However, according to other examples not described herein, other types of spacecraft (space platform, launch vehicle, deep-space probe, etc.) can also be considered. The disclosure can thus apply in a more general manner to any spacecraft in a low orbit, the rotation whereof about itself is sought to be passively controlled when in a spent configuration.

The satellite 100 comprises a main body 110. In practice, said main body 110 encompasses a certain number of common equipment, not shown in FIG. 1, such as motors, sensors and miscellaneous electronics, etc. Moreover, the main body 110 of the satellite 100 can also be combined with other elements so as to form the entire satellite 100, said other elements not being shown in FIG. 1 since, as such, they do not fall within the scope of the disclosure. For example, said other elements are solar panels arranged on either side of the main body 110, secured to the main body 110.

In the non-limiting example shown in FIG. 1, the main body 110 of the satellite 100 has a substantially cubic shape. However, other shapes of the main body 110, such as cylindrical, spherical, parallelepipedal and rectangular shapes, etc. are also possible.

Said main body 110 comprises an outer surface 111 that is closed and intended to be exposed to a vacuum, as well as an inner surface 112 that is closed and opposite said outer surface 111.

The satellite 100 comprises an attitude control system comprising, on the one hand, active attitude control means 150. Said active attitude control means are suitable for the three-axis stabilisation of the attitude of said satellite 100 by generating an active control torque of maximum value $C_a$.

Preferably, said active attitude control means 150 comprise actuators such as momentum wheels (reaction wheels, gyroscopic actuators) or magnetic torque rods. For example, and as shown in FIG. 1 in a non-limiting manner, said active attitude control means comprise three reaction wheels 150 respectively generating three auxiliary active control torques, the respective directions of these auxiliary torques being linearly independent such that the sum thereof forms said active control torque.

On the other hand, the attitude control system comprises passive attitude control means 200. Said passive attitude control means 200 are suitable for generating, in cooperation with the Earth's magnetic field, a damping torque so as to slow the rotation of the satellite 100 about itself.

In one specific embodiment, said passive control means 200 generate a damping torque of maximum value $C_p$ such that the ratio $C_p/C_a$ is substantially greater than 10, preferably substantially greater than 100. Such a torque ratio $C_p/C_a$ is advantageous in that, when the satellite 100 is on a mission, it makes any effect caused by the operation of the passive attitude control means 200 on the operation of the active attitude control means 150 negligible. More specifically, since it does not consume power, it is understood that said passive control means 200 generate a damping torque both during a mission and in the spent configuration. Thus, the term "negligible" is understood herein to refer to an effect that is low enough to ensure that the use of the passive control means 200 does not require, in order to correctly perform the mission of the satellite 100, the use of active control means 150 that are oversized (in particular in terms of weight, bulk and cost) relative to a standard configuration that does not comprise passive control means 200.

Moreover, the satellite 100 is subjected, in its orbit, in a manner known to a person skilled in the art, to external perturbation torques, for example atmospheric drag, solar radiation pressure, and a gravity gradient, etc. Thus, in one specific embodiment of the invention, the passive control means 200 are configured so as to generate a passive control torque of maximum value $C_p$ that is less than said external perturbation torques by a factor of substantially equal to 10, preferably substantially equal to 100. Insofar as the active control means are sized such that they correct the attitude of the satellite 100 facing those external perturbation torques, it is understood that the effect of the passive control means on the active control means remains negligible in such a configuration.

However, it is understood that the arrangements described hereinabove and relative to the ratio between the maximum torque of the passive control means 200 and, either the maximum torque of the active control means 150 or the external perturbation torque, constitute additional characteristics. Thus, an intended purpose, i.e. producing a satellite 100 comprising active attitude control means 150, and passive attitude control means 200 suitable for slowing the rotation of said spacecraft 100, can be achieved without the need to employ these additional characteristics.

Figure 6:
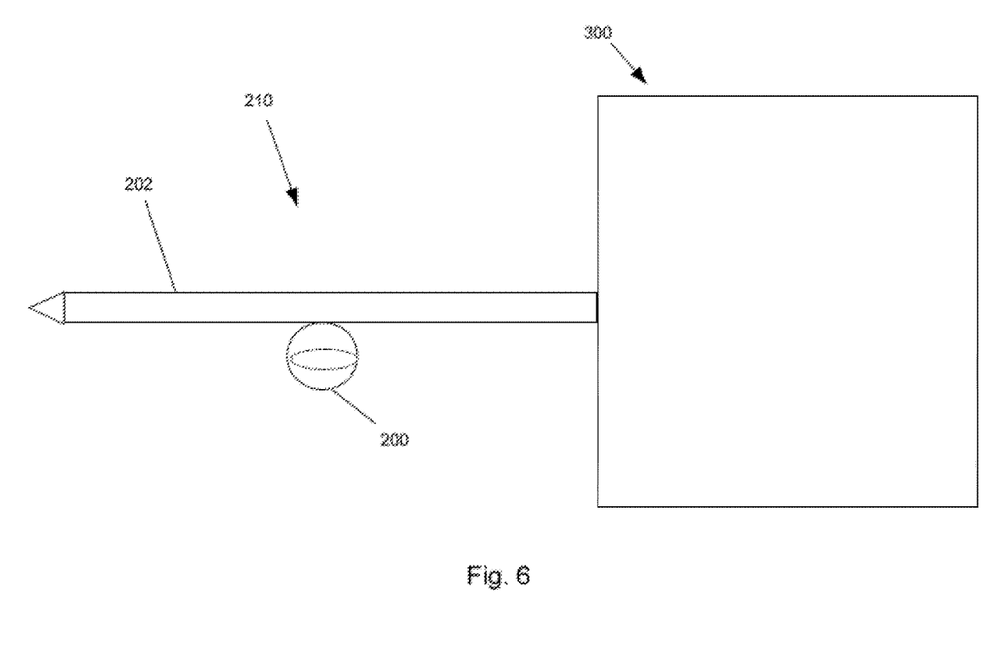
FIG. 6: a diagrammatic view of an example of a projectile attached to a space delivery vehicle.

As illustrated in FIG. 6, it should be noted that the passive control means 200 is a passive damper that can be delivered to the satellite 100 by another space vehicle 300, for example when the attitude control system of said satellite 100 has malfunctioned. In such a case, a so-called "space delivery vehicle" as described in patent application EP2746163, could approach the satellite 100 and deploy a harpoon 202, on which such a passive damper 200 is fixedly mounted, so as to form a projectile 210 intended for damping the satellite 100. The harpoon 202 would, for example, be adapted from the harpoon described in the patent application EP2671804 in order to carry the passive damper. The term "fixedly mounted" is used herein to refer to the fact that the passive damper 200 engages with the harpoon 202 in a fixed manner, such that it is rigidly secured thereto, such engagement being possible in any area of the harpoon. For example, the passive damper 200 is fixedly mounted on one of the ends of said harpoon, or between the ends of said harpoon 202 on the outer surface thereof. Once projected, such a harpoon 202 equipped with the passive damper 200 does not retain any physical ties with the space delivery vehicle 300.

Thus, when the satellite 100 is in the spent configuration thereof, and thus capable of being animated by a high rotational speed, the space delivery vehicle firstly enters a phase in which it approaches the satellite 100. When the distance separating it from the satellite 100 is equal to a predetermined distance, for example calculated in advance by means of digital simulations, the space delivery vehicle adopts an appropriate attitude ensuring that the projectile is pointing towards the satellite 100. The projectile is then deployed towards the satellite 100 in order to reach same and thus secure the harpoon, via one of the ends thereof, to the body 110 of the satellite 100. The rotation of the satellite 100, which is not mechanically connected to the delivery vehicle, is then dampened thanks to the passive damper 200 before said satellite is captured in order to be removed from the trajectory thereof. Capture of the satellite 100 is, for example, performed by said space delivery vehicle, however other known means of capture are also possible.

A person skilled in the art will clearly see that one possible alternative design of the space delivery vehicle consists in considering same to comprise, not just a single projectile as described hereinabove, but a plurality of projectiles, for example three, said projectiles being intended to reach different points of the body 110 of the satellite 100. For this purpose, the projectiles preferably reach the satellite 100 such that they are spaced apart by a predetermined minimum distance, in order to minimise any possible magnetic perturbation between the respective inner bodies 220 of the passive dampers 200. A person skilled in the art knows how to determine such a distance, since the spatial decay of the electromagnetic field generated by an inner body 220 follows a known law.

Figure 2:
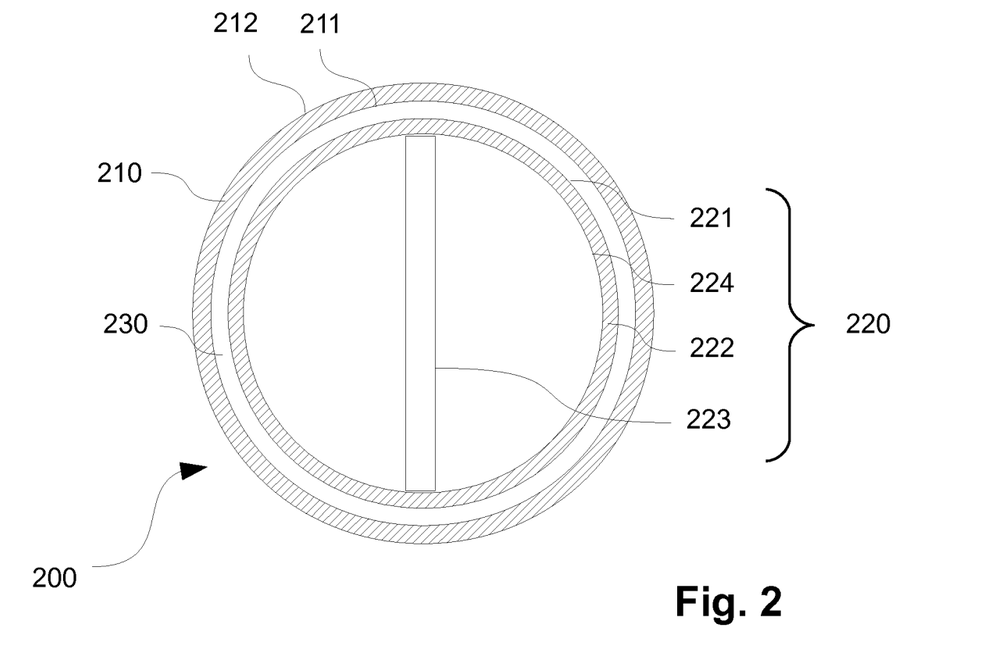
FIG. 2: a diagrammatic view of one specific embodiment of the passive control means in FIG. 1, wherein said passive control means comprise at least one passive damper comprising an inner body capable of moving in rotation about arbitrary axes of rotation.

FIG. 2 diagrammatically illustrates one specific embodiment of the passive control means 200 in FIG. 1, wherein said passive control means 200 comprise at least one passive damper 200, a sectional view whereof is shown in FIG. 2.

In the non-limiting example shown in FIG. 2, said passive damper 200 comprises an outer enclosure 210 and an inner body 220.

As shown in FIG. 2, the inner body 220 is positioned inside said outer enclosure 210. Moreover, the outer enclosure 210 comprises an inner surface 211 that is closed, and the inner body 220 comprises an outer surface 221 that is closed, and that is opposite and separate from the inner surface 211 of the outer enclosure 210. The inner surface 211 and outer surface 221 respectively of the outer enclosure 210 and of the inner body 220 are separated by means of a viscous fluid 230.

In one preferred embodiment, shown in a non-limiting manner in FIG. 2, the passive damper 200 is devoid of any means for maintaining a gap between the outer enclosure 210 and the inner body 220. Such a configuration is advantageous since it simplifies the production of the passive damper 200, and allows the inner body 220 to move freely in the volume delimited by the inner surface 211 of the outer enclosure 210. The term "freely" is understood herein to mean that the outer surface 221 of the inner body 220 is capable of being in contact with the inner surface 211 of the outer enclosure 210.

However, according to other examples not described herein, the passive damper 200 can also comprise means for maintaining a gap between the outer enclosure 210 and the inner body 220. For example, said gap-maintaining means comprise ball bearings, evenly distributed around the inner body 220 in the space occupied by the viscous fluid.

Moreover, the outer enclosure 210 of the passive damper 200 is fixed to the main body 110 of the satellite 100 for rotation therewith. For example, the outer enclosure 210 comprises an outer surface 212 that is closed and opposite the inner surface 211 of the outer enclosure 210, said outer surface 212 being maintained fixed to the main body 110 by bonding, welding or any other means.

In one specific embodiment, and as shown in FIG. 1, said at least one passive damper 200 is positioned on the inner surface 112 of the main body 110.

In another specific embodiment, said at least one passive damper 200 is positioned on the outer surface 111 of the main body 110.

The passive damper 200 is also designed such that the inner body 220 is capable of moving in rotation inside the outer enclosure 210 about at least one axis of rotation.

In one specific embodiment, said inner body 220 is capable of moving in rotation inside the outer enclosure 210 about arbitrary axes of rotation. In this manner, the freedom of movement of the inner body 220 inside the outer enclosure 210 is virtually total since this rotational mobility of the inner body 220 is cumulated with the fact that no mechanical device opposes the movement of said inner body 220 until contact is made with the outer enclosure 210.

For example, and as shown in FIG. 2 in a non-limiting manner, the inner surface 211 of the outer enclosure 210 and the outer surface 221 of the inner body 220 preferably each have a spherical shape. Such a configuration is advantageously suited for rotational mobility about arbitrary axes. In the case whereby said inner surface 211 and outer surface 221 come into contact with one another, said contact is limited, at all times, to a restricted area of said surfaces so as to minimise the risks of attachment resulting from the Van der Waals forces between these two surfaces. As regards these attachment risks, the choice of materials is also important, as explained hereafter. However, the inner surface 211 of the outer enclosure 210 and the outer surface 221 of the inner body 220 can also take on other shapes, for example respectively cylindrical shapes, as described hereafter in an alternative embodiment. Moreover, the satellite 100 can also comprise a plurality of passive dampers 200, that are respectively capable of moving in rotation inside the outer enclosure 210 about arbitrary axes of rotation.

The passive damper 200 is furthermore configured such that said inner body 220 is permanently magnetised. Thus, when the satellite 100 is on a mission travelling about the Earth, the inner body 220 is subjected to a magnetic torque as a result of the interaction thereof with the Earth's magnetic field so as to align the magnetic moment of the inner body 220 with the Earth's magnetic field. This interaction is independent from the operating state of the satellite 100, and continues to exist when the latter is in the spent configuration thereof.

More particularly, the magnetic torque to which the inner body 220 is subjected is a function of the respective intensities of the Earth's magnetic field and of the magnetic moment of the inner body 220. Thus, in the present embodiment, the satellite 100 is orbiting such that the Earth's magnetic field has a sufficient intensity and the dimensions of the inner body 220 are equal to about several centimetres. For example, the outer surface 221 of the inner body 220 is a sphere, the radius whereof is substantially equal to 5 cm.

In a preferred embodiment shown in a non-limiting manner in FIG. 2, the inner body 220 comprises an inner enclosure 222 comprising a permanent magnet 223 fixed to said inner enclosure 222 for rotation therewith. For example, said inner enclosure 222 comprises a spherical inner surface 224 that is closed and opposite the outer surface 221 of said inner enclosure 222, and delimiting an inner volume. Said permanent magnet 223 has a magnetic moment that generally lies in an interval [0.1 A·m², 1.5 A·m²] (where "A·m²" used herein denotes Amperes multiplied by square metres), has a substantially cylindrical shape, and is maintained, by bonding, welding or any other means, fixed to said inner surface 224 of the inner enclosure 222. For example, the permanent magnet 223 is made of a Neodymium-iron-boron alloy grade N52 and is present in the shape of a cylinder measuring 8 cm in length with a radius of 3.36 cm. Such a configuration produces a magnetic moment of 1.5 A·m².

Thus, when the satellite 100 is in orbit, said permanent magnet 223 tends to align itself with the Earth's magnetic field such that the inner enclosure 222 always substantially orients the same part of the outer surface 221 thereof towards the Earth's magnetic field. However, according to other examples not described herein, the permanent magnet 223 can also take on other forms, as can the inner surface 224 of the inner enclosure 222.

In one more specific embodiment, said inner enclosure 222 comprises a substrate inside a volume that is not occupied by the permanent magnet 223.

The use of a low-density substrate, for example made of polyurethane foam, is advantageous to ensure that the volume density of the inner body 220 reaches a predetermined value when, for example, the respective dimensions and materials of said inner enclosure 222 and of said permanent magnet 223 are prescribed without any possibility of modification during the manufacture thereof. For example, said polyurethane foam has a density that lies in an interval [240 kg·m⁻³, 880 kg·m⁻³] (where "kg·m⁻³" used herein denotes kilograms per square metre).

Alternatively, in an alternative embodiment, the inner body 220 is solid. For example, the entire inner body 220 is a spherical permanent magnet.

It should be noted that the choice of materials used in the composition of the passive damper 200 is important. In this respect, these materials must be chosen such that they meet weight restrictions inherent to the astronautics field, as well as, in the case of the present disclosure, such that those forming the outer enclosure 210 are not magnetic. Furthermore, the materials of the passive damper 200 must meet robustness requirements, given that the inner body 220 is capable of coming into contact with the outer enclosure 210.

Thus, in a preferred embodiment, at least one of either the inner surface 211 of the outer enclosure 210 and the outer surface 221 of the inner body 220 is made using a non-metallic material. Such a configuration is advantageous since it reduces the risks of attachment between the outer enclosure 210 and the inner body 220 in the event that the latter move closer to one another, for example as the result of electrostatic interactions caused by Van de Waals forces exerted between the respective atoms of said inner surface 211 and said outer surface 221.

Preferably, the inner surface 211 of the outer enclosure 210 is made of a synthetic resin of the polyimide type. More particularly, said inner surface 211 is advantageously made of Vespel® which is a material certified for use in space.

It is also understood that, in order to limit contact between the inner body 220 and the outer enclosure 210, said inner body 220 advantageously remains in suspension and centred in the viscous fluid 230.

For this purpose, in a preferred embodiment, the densities of respectively the inner body 220 and of the viscous fluid 230 are substantially equal, at least for a temperature of said viscous fluid 230 within the interval [10° C., 30° C.] (where "° C." used herein denotes degrees Celsius). In other words, for this temperature, for example 20° C., the buoyancy of the inner body 220 is substantially zero.

One additional advantage provided by such zero buoyancy of the inner body 220 within such a temperature interval is the ability to perform operational tests on the passive damper 200 when the latter is placed in a gravitational field, for example 1 g (or, in an equivalent manner, 9.8 m·s⁻²) at the Earth's surface, which is less restrictive, in particular from an implementation perspective, than operational tests in a microgravity environment.

In one specific embodiment of the invention, the pressure of the viscous fluid 230 is substantially equal to 5 bar for at least one temperature that lies in the interval [10° C., 30° C.]. Such a positive pressure in such a temperature interval is advantageous since it prevents any vaporisation of said viscous fluid 230 when the satellite 100 is:
  either in operation in an operational orbit, which corresponds to temperatures of the fluid 230 that lie in an interval [0° C., 50° C.],
  or in a spent configuration orbit, which corresponds to temperatures of the fluid 230 that lie in an interval [−75° C., 0° C.], the inventors in particular having observed that said pressure remains substantially positive and equal to 1 bar for at least one temperature that lies in an interval [−75° C., −65° C.].

Preferably, the viscous fluid 230 is silicon oil of the dimethicone type. More particularly, said viscous fluid 230 is advantageously of the type PSF-5 cSt®, where the variations in density, dynamic viscosity, and kinematic viscosity of this fluid 230 in an interval [−75° C., 50° C.] are known to a person skilled in the art. However, according to other examples not described herein, other viscous fluids 230 can also be considered.

In the description hereafter and in a non-limiting manner, a situation is described wherein the satellite 100 is in orbit, rotating about an arbitrary axis of rotation, and comprises a passive damper 200 as shown in FIG. 2, the viscous fluid 230 being silicon oil of the dimethicone type. Moreover, said satellite 100 is close enough to the Earth for the inner magnet 223 to cooperate with the Earth's magnetic field according to the same principle as a compass. Thus, said inner body 220 is subjected to a magnetic torque that is equal to the vector product of the magnetic moment of the inner magnet 223 by the intensity of the Earth's magnetic field.

Since it is fixed to the satellite 100 for rotation therewith, the outer enclosure 210 is thus animated by a rotational movement that is identical to that of the satellite 100, said rotational movement being firstly transmitted to the viscous fluid 230 in contact with the inner surface 211 of said outer enclosure 210, then secondly to the inner body 220, the outer surface 221 whereof is also in contact with said viscous fluid 230.

Thus, said inner body 220 is not driven by the rotational movement of the viscous fluid 230 since it is, on the one hand, held back by the permanent magnet 223 which tends to remain aligned with the Earth's magnetic field, and on the other hand, substantially centred in said fluid 230, and thus not in contact with the outer enclosure 210 as a result of the zero buoyancy thereof. Such a configuration of said passive damper 200 is particularly advantageous since, as long as the outer enclosure 210 is rotating, the fluid 230 is subjected to shear stresses originating from the differential in rotational speed between said outer enclosure 210 and said inner body 220, these shear stresses ensuring the dissipation of energy associated with the rotational movement of the outer enclosure 210, and thus of the satellite 100.

It should be noted that, in the specific case in which the outer enclosure 210 and the inner body 220 are two concentric spheres respectively having the radii R1 and R2, and for respective rotational speeds $\Omega 1$ and $\Omega 2$, and in which the viscosity of the fluid is denoted $\mu$, the viscous torque exerted on the inner body 220 can be estimated using the following formula:

$$T = -8\pi\mu \frac{R_1^3 R_2^3}{R_1^3 - R_2^3}(\Omega_2 - \Omega_1)$$

It is furthermore understood that the more the rotational speed of the outer enclosure 210 increases, the higher the shear stresses, and the more the damping torque increases, which advantageously allows the rotation of the satellite 100 to be slowed down. In this respect, the inventors have observed that when the damping torque became substantially equal, as an absolute value, to the magnetic torque exerted on the inner body 220, said inner body 220 was, in turn, driven by the rotational movement of the fluid 230. This results in a decrease in the effectiveness of the passive damper 200, which should be limited by dimensioning the passive damper 200 accordingly, as described, for example, hereinbelow.

Finally, it should be noted that although the passive damper 200 is designed so as to preferably prevent any contact between the outer enclosure 210 and the inner body 220, in particular by means of a substantially zero buoyancy of said inner body 220 for at least one temperature of said viscous fluid 230 falling in the interval [10° C., 30° C.], this technical characteristic can become invalid when the satellite 100 is in orbit. This is, for example, the case when said passive damper 200 is subjected to angular accelerations when it is far from the centre of mass of the satellite 100, these angular accelerations being capable of amplifying the effect of a buoyancy differential, in particular when cold when the density of the viscous fluid 230 becomes greater than the density of the inner body 220.

However, the inventors have observed, by digital simulations, that when the inner body 220 and the outer enclosure 210 are in contact and moving relative to one another, said passive damper 200 is still suitable for generating a damping torque. In particular, they have established that in the case wherein the outer enclosure 210 and the inner body 220 are two concentric spheres, the damping torque increases with the off-centring between the respective centres of said two spheres. Thus, it is understood that the passive damper 200 is effectively still suitable for slowing the rotation of the satellite 100.

In the precise example embodiment of the passive damper 200 in FIG. 2, the outer enclosure 210 and the inner enclosure 222 are made of Vespel®. The outer and inner radii of the outer enclosure 210 are respectively equal to 5.25 cm and 5 cm. The outer and inner radii of the inner enclosure 222 are respectively equal to 4.9 cm and 4.65 cm. The permanent magnet 223 is cylindrical in shape, has a length of 8 cm and a radius of 3.26 mm, and has a magnetic moment that is equal to 1.5 A·m². The viscous fluid 230 is dimethicone oil of the type PSF-5 cSt®, the passive damper 200 comprising a mass of 29 g thereof. Moreover, the inner enclosure 222 and the permanent magnet 223 have a cumulated mass of 458 g, and said inner enclosure 222 comprises polyurethane foam having a density of 684 kg·m$^{-3}$, in a volume not occupied by said permanent magnet 223 and in a sufficient quantity for the inner body 220 to have a density that is substantially equal to the density of the fluid 230 at 20° C.

The inventors have observed that such a configuration of the passive damper 200 ensures sufficient slowing of the rotation of a satellite 100, the inertia whereof is substantially equal to 100 kg·m², placed in a circular polar orbit at a height of 700 km, and the active attitude control means whereof have malfunctioned, in a time interval varying from 1 week to 6 months. Such a time interval is particularly advantageous since it involves, for example, deorbiting a satellite 100 at the end of its life from a satellite constellation.

It is thus understood that the dimensioning of the passive damper 200 as well as the materials used in the composition thereof and the type of viscous fluid 230 are chosen so as to ensure slowing of the rotational speed of the satellite 100, preferably stopping said rotation by a fixed deadline (for example 6 months), but also to guarantee that said device 200 remains functional, even at low temperatures, for example up to −75° C., when all energy sources on-board the satellite 100 are spent.

Figure 3:
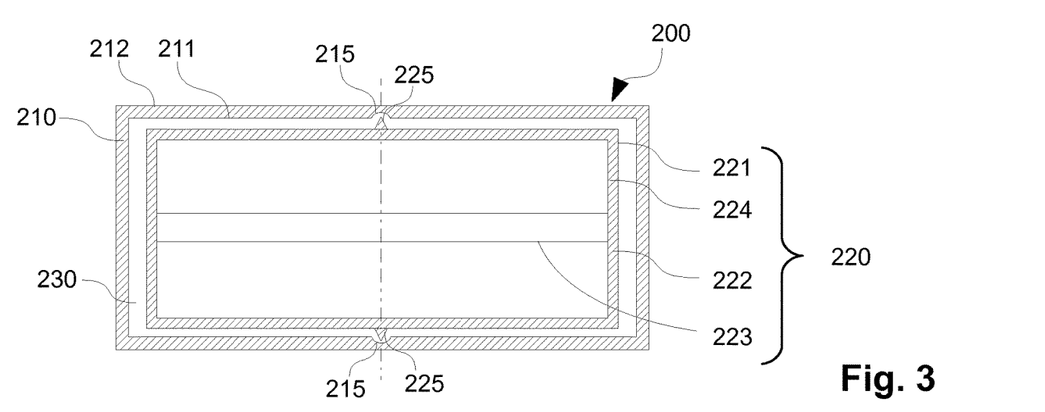
FIGS. 3 and 4: diagrammatic views of alternative embodiments of said at least one passive damper in FIG. 2, wherein said inner body is capable of moving in rotation about a single axis of rotation.
Figure 4:
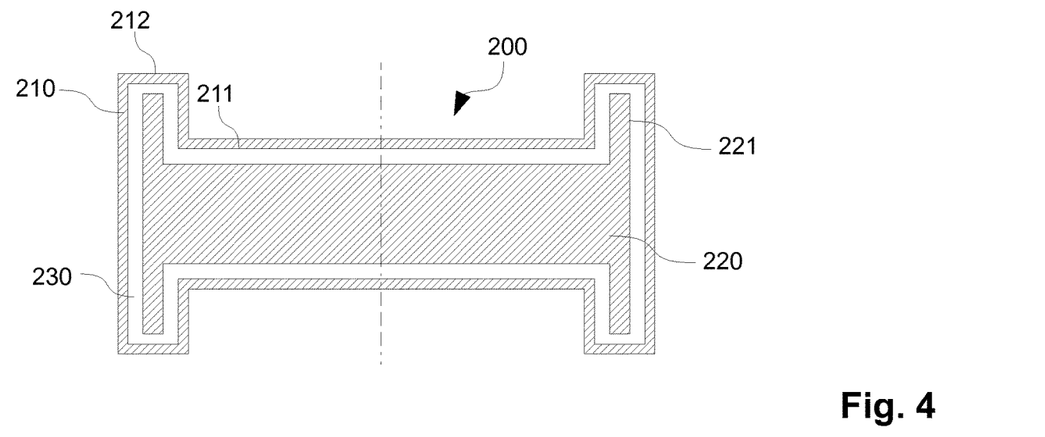

FIGS. 3 and 4 diagrammatically show an alternative embodiment of a passive damper 200 in FIG. 2, wherein the inner body 220 is capable of moving in rotation inside the outer enclosure 210 about a single axis of rotation (shown by a dotted line in FIGS. 3 and 4).

For example, and as shown in FIGS. 3 and 4, the inner surface 211 of the outer enclosure 210 and the outer surface 221 of the inner body 220 each have a single axis of revolution that is substantially aligned with said single axis of rotation, and are furthermore substantially proportional.

In such a configuration, the outer surface 221 of the inner body 220 also advantageously has, at the axis of rotation, protrusions 225, the respective ends whereof are housed, in a contactless manner, inside cavities 215 made, at the axis of rotation, in the inner surface 211 of the outer enclosure 210. For example, and as shown in a non-limiting manner in FIG. 3, the outer surface 221 of the inner body 220 comprises two protrusions 225, the respective ends whereof are pointed, said protrusions being respectively positioned at the level of two points of intersection of the axis of rotation with said outer surface 221. These protrusions 225 associated with said cavities 215 have the advantage, in addition to the choice of appropriate material for the inner surface 211 of the outer enclosure 210, and the outer surface 221 of the inner body 220, of minimising the risks of attachment caused by the Van der Waals forces between these two surfaces. However, according to other examples not described herein, the end of the protrusions can also be non-pointed. Moreover, such arrangements are not limited to the configuration in FIG. 3.

In the example shown in FIG. 3, according to a sectional plane that passes through the axis of rotation, the inner surface 211 of the outer enclosure 210 and the outer surface 221 of the inner body 220 are respectively cylindrical in shape. More particularly, the inner body 220 comprises an inner enclosure 222, comprising a permanent magnet 223, and the outer surface 212 of the outer enclosure 210 in addition to the inner surface 224 of the inner enclosure 222 are also respectively cylindrical in shape. However, according to other examples not described herein, the outer surface 212 of the outer enclosure 210 and the inner surface 224 of the inner enclosure 222 can also take on other shapes.

In the example shown in FIG. 4, according to a sectional plane that passes through said single axis of rotation, the inner surface 211 of the outer enclosure 210 and the outer surface 221 of the inner body 220 are respectively H-shaped. More particularly, the inner body 220 is solid and the outer surface 212 of the outer enclosure 210 is also H-shaped. Such a configuration in particular allows the shearing surface to be increased for identical overall dimensions.

It is understood that such an alternative embodiment allows the freedom of movement of the inner body 220 inside the outer enclosure 210 to be limited, such that the passive damper 200 is intended to slow the component of the rotational movement of a satellite 100 projecting on said single axis of rotation.

Figure 5:
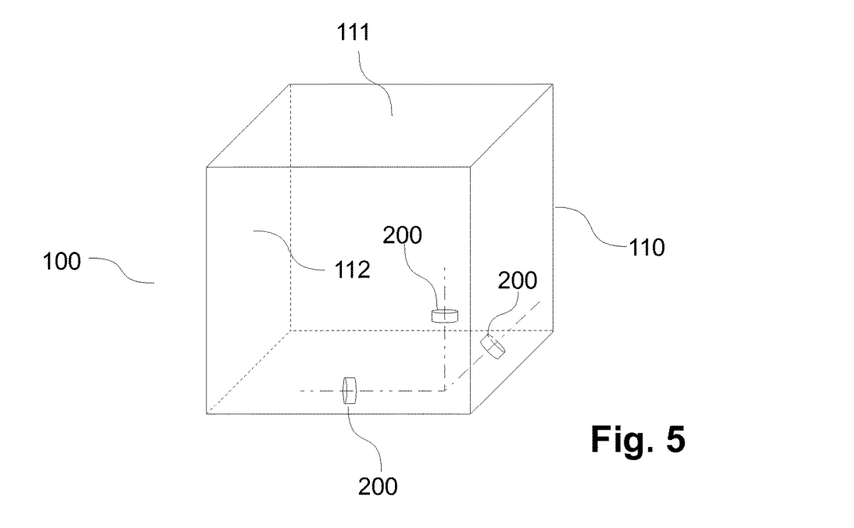
FIG. 5: a diagrammatic view of a preferred alternative embodiment of the spacecraft in FIG. 1, wherein said spacecraft comprises three passive dampers as shown in FIG. 3.

FIG. 5 shows a preferred alternative embodiment of the satellite 100, wherein said satellite 100 comprises three passive dampers 200 as shown in FIG. 3, said three passive dampers 200 being positioned on the inner surface 112 of the main body 110, and arranged such that the axes of rotation of the respective inner bodies 220 thereof are not parallel in pairs. Such a configuration is equivalent, from a theoretical perspective, to that of a passive damper 200 comprising at least one inner body 220 capable of moving in rotation inside the outer enclosure 210 about arbitrary axes of rotation. However, according to other examples not described herein, three passive dampers 200 different to those shown in FIG. 3 can also be used, for example passive dampers 200 such as those shown in FIG. 4. More generally, three passive dampers 200 can be used, configured such that the respective inner bodies 220 thereof are capable of moving in rotation about a single axis of rotation, and arranged such that these axes of rotation are not parallel in pairs.

Moreover, the inventors have observed that the present invention could be implemented by means of two passive dampers 200, configured such that the respective inner bodies 220 thereof are capable of moving in rotation about a single axis of rotation, and arranged such that these axes of rotation are not parallel in pairs. More specifically, such a configuration produces passive attitude control means, the performance whereof is substantially equal to that of a configuration comprising three passive dampers 200 of the same type. More specifically, and in practice, when the satellite 100 is in the spent configuration thereof, it is animated by a rotational movement, at a high speed, according to a plurality of axes of rotation. Even if the satellite 100 were animated by a rotational movement according to a single axis of rotation, the probability that this single axis of rotation is contained within a plane orthogonal to the plane defined by the axes of rotation of the two inner bodies 220 is negligible.

In addition, the passive attitude control means can also comprise a single passive damper 200 configured such that the inner body 220 thereof is capable of moving in rotation about a single axis of rotation. The inventors have observed that such a configuration would procure a high-performance reduction in the rotational speed of the satellite 100 in the spent configuration thereof.

Generally speaking, it should be noted that the embodiments considered above have been described by way of non-limiting examples, and other alternative embodiments can thus be envisaged.

The invention claimed is:

1. A projectile configured to damp a spacecraft including a main body and an active attitude control system configured to provide 3-axis stabilization of the attitude of said spacecraft, said projectile comprising:
 a harpoon; and
  a passive damper fixedly mounted on said harpoon and configured to generate, in cooperation with the magnetic field of the Earth, a damping torque to damp the spacecraft when the passive damper is fixed to the spacecraft, said passive damper comprising an outer enclosure comprising an inner surface, and
  an inner body positioned inside said outer enclosure and configured to move in rotation inside said outer enclosure about at least one axis of rotation, the inner body being permanently magnetized, said inner body comprising an outer surface, said inner surface of the outer enclosure and the outer surface of the inner body being separated by a viscous fluid,
  wherein said outer enclosure is configured to be fixed to the main body of said spacecraft for rotation therewith in a state in which the harpoon is secured to said main body,
  the projectile is configured to be connected to a space delivery vehicle, that is different from the spacecraft, in order to be projected from said space delivery vehicle towards said spacecraft, and
  the inner surface of the outer enclosure and the outer surface of the inner body respectively have a cylindrical shape.

2. The projectile according to claim 1, wherein the inner body of the passive damper is configured to move in rotation inside said outer enclosure about a single axis of rotation, the inner surface of the outer enclosure and the outer surface of the inner body each having a single axis of revolution that is substantially aligned with said single axis of rotation, and which are substantially proportional.

3. A space delivery vehicle comprising:
 at least one of the projectile according to claim 2.

4. A space delivery vehicle comprising:
 at least one of the projectile according to claim 1.

5. The projectile according to claim 1, wherein the inner body is configured to move in rotation inside the outer enclosure about a single axis of rotation.

6. The projectile according to claim 5, wherein the inner surface of the outer enclosure and the outer surface of the inner body each have a single axis of revolution that is substantially aligned with the single axis of rotation, and are substantially proportional.

7. The projectile according to claim 1, wherein the density of the inner body and the density of the viscous fluid are substantially equal for a temperature of the viscous fluid within a range of 10° C.–30° C.

8. The projectile according to claim 1, wherein the pressure of the viscous fluid is substantially equal to 5 bar for at least one temperature that lies within a range of 10° C.–30°

C. such that vaporization of the viscous fluid is prevented when the spacecraft is either in operation in an operational orbit that corresponds to temperatures of the viscous fluid within a range of 0° C.–50° C. or in a spent configuration orbit that corresponds to temperatures of the fluid that lie within a range of –75° C. to 0° C.

9. The projectile according to claim 8, wherein the pressure of the viscous fluid remains substantially positive and equal to 1 bar for at least one temperature that lies in within a range of –75° C. to –65° C.

10. The projectile according to claim 1, wherein the inner body comprises a substrate of polyurethane foam.

11. The projectile according to claim 10, wherein the substrate of polyurethane foam has a volume density within a range of 240 kg·$m^{-3}$–880 kg·$m^{-3}$.

12. The projectile according to claim 1, wherein the entire inner body is a spherical permanent magnet.

13. The projectile according to claim 1, wherein the outer surface of the inner body includes protrusions at an axis of rotation,
the inner surface of the outer enclosure includes cavities defined therein, and
respective ends of the protrusions are housed, in a contactless manner, inside the cavities.

14. The spacecraft according to claim 1, wherein the inner surface of the outer enclosure comprises a plurality of cavities,
the outer surface of the inner body has, at the axis of rotation, a plurality of protrusions, and
respective ends of the plurality of protrusions are housed inside the plurality of cavities.

15. The spacecraft according to claim 14, wherein the plurality of protrusions are housing inside the plurality of cavities in a contactless manner.

* * * * *